United States Patent Office 3,557,215
Patented Jan. 19, 1971

3,557,215
PROCESS FOR THE PREPARATION OF CYCLO-
ALKANOLS AND MIXTURES OF CYCLOALKA-
NOLS AND CYCLOALKANONES
Jacques Paul Marie Bonnart, Lyon, Yannik Bonnet, Ecully, and Paul Pierre Marie Rey, Lyon, France, assignors to Rhone-Poulenc S.A.
No Drawing. Filed Apr. 17, 1967, Ser. No. 631,185
Claims priority, application France, Apr. 20, 1966, 58,341
Int. Cl. C07c 35/08, 45/00
U.S. Cl. 260—586
8 Claims

ABSTRACT OF THE DISCLOSURE

The catalytic hydrogenation of cycloalkane, especially cyclohexane, hydroperoxides to produce cycloalkanols, alone or in admixture with cycloalkanones, is improved by adding water, in an amount greater than one molecule per molecule of hydroperoxide, to the hydrogenation mixture.

---

This invention relates to the preparation of cycloalkanols and mixtures of cycloalkanols and cycloalkanones, and concerns more especially the treatment of oxidation products containing hydroperoxides obtained by the oxidation of cycloalkanes by air or oxygen.

Aliphatic diacids are of great importance in the production of polycondensates such as polyesters and polyamides. Some of these diacids are commonly prepared by oxidative cleavage of cycloalkanols, or mixtures of cycloalkanols and cycloalkanones, which are themselves prepared from cycloalkanes by various methods, all of which include the step of oxidizing the cycloalkane with air or oxygen with formation of a hydroperoxide, which is then decomposed, either in a second stage separate from the oxidation stage, or as it is produced, while the oxidation of the cycloalkane is continued.

When the operation is carried out so as to decompose the hydroperoxide as it is formed, a mixture formed mainly of cycloalkanol and cycloalkanone which contains only a relatively small amount of hydroperoxide is finally obtained. The total yield of these products obtained from the process is not very satisfactory, and a relatively large proportion of undesirable by-products, including acid products, is obtained.

To improve the yield and to limit the formation of undesirable by-products, various solutions have been proposed, e.g.: oxidation in the presence of agents which neutralise the acids formed in the reaction and which are regarded as responsible for the secondary reactions (see French Pat. No. 886,795); alternate oxidation and reduction, so that the reduction converts the peroxides and ketones into alcohols (see French Pat. No. 1,327,137); oxidation in the presence of boric acid or boric anhydride (see Belgian Pat. No. 635,117) or in the presence of boric esters (see French Pat. No. 1,305,852), the final product then being a cycloalkanol borate, from which the cycloalkanol is liberated by hydrolysis or alcoholysis. These various proposals improve the process, but involve additional treatments which add fairly considerable complications.

It has also been proposed to carry out the oxidation of the cycloalkanes under sufficiently gentle conditions to yield oxidation products which contain mostly hydroperoxide, and, by a subsequent treatment of the solution obtained, to convert the hydroperoxide into a cycloalkanol. This subsequent treatment may consist in heating the hydroperoxide solution in the presence of a soluble catalyst (see British Pat. No. 777,087) or in the presence of a solid catalyst (U.S. Pat. No. 2,851,496). Apart from cycloalkanol, obtained by reaction between cycloalkane hydroperoxide and cycloalkane, these processes also yield cycloalkanone and a fairly considerable proportion of undesirable by-products.

Reduction of the hydroperoxide has also been proposed (see U.S. Pat. No. 2,497,349). This reduction may be carried out chemically with sulphur compounds or with metal salts. However, such processes are accompanied by a certain degree of decomposition of the hydroperoxide, and the products obtained are very often contaminated by impurities which are difficult to remove. The reduction may also consist of a hydrogenation with molecular hydrogen in the presence of a catalyst such as nickel, platinum, platinum oxide, palladium, copper or copper chromite, which is employed alone or on a solid support. Here again, the production of cycloalkanol is accompanied by the formation of undesirable by-products, sometimes in a relatively high proportion.

Despite all the efforts hitherto made to improve the conversion of cycloalkanes into cycloalkanols or into mixtures of cycloalkanols and cycloalkanones, great difficulty has been experienced in appreciably reducing or eliminating the parasitic reactions, and in practice the disadvantages consequent upon the presence of these undesirable by-products, i.e tarring, clogging of the apparatus and poisoning of the catalysts, have not been successfully avoided.

The present invention provides an improved process for the preparation of cycloalkanols, or mixtures of cycloalkanols and cycloalkanones, from cycloalkane hydroperoxides, which gives these products in much higher yields than earlier processes, and which is not attended by the disadvantages encountered in known processes. The new process comprises hydrogenating the said hydroperoxide in the presence of a hydrogenation catalyst carried on a neutral or acid support, and more than one molecular proportion of water per molecular proportion of hydroperoxide.

Any hydroperoxide-containing product obtained by the oxidation of cycloalkane may be treated by the new process, but the benefit of the new process is the more marked as the proportion of hydroperoxide in the oxidation product is higher, as in this case the proportion of undesirable by-products in the starting material is at a minimum. In practice, therefore, it is generally more advantageous to start with an oxidation product obtained by oxidation of a cycloalkane by air, without a catalyst, optionally under pressure, the temperature and the extent of conversion being so chosen as to minimise the production of undesirable by-products, the operation being carried out in an apparatus which does not catalyse the decomposition of the hydroperoxide. In the case of steel apparatus, the steel may be passivated prior to the operation, for example with pyrophosphates. When the oxidation product is prepared specifically to obtain hydroperoxide, the oxidation is preferably stopped as soon as the content of products less volatile than cycloalkane reaches about 4% by weight, which generally corresponds to a cycloalkane hydroperoxide content of about 2.5%, the remainder consisting of cycloalkanol, cycloalkanone and various by-products. Such oxidation products may be subjected as such to the process of this invention, or they may be previously concentrated in known manner. Since the oxidation is often carried out under pressure, a simple means of concentrating the oxidation product is simply to allow the hot oxidation product leaving the oxidation apparatus to expand. The oxidation product may be brought to any desired concentration. However, since the hydrogenation reaction of the invention is exothermic, it is desirable that the solution employed should not be too highly concentrated, in order to avoid excessive heating, which would be prejudicial to good yields and difficult to control. In practice, there is no advantage in attempting to employ solutions of oxidation products in which the total peroxide concentration is higher than 25%.

The proportion of water in the hydrogenation mixture must not be too low or it will be ineffective. Thus, the water which may be produced in the course of the oxidation and entrained with the oxidation product, and the water produced during the reduction of the oxidation product, are together insufficient. It is essential to add water to the oxidation product before it is subjected to the hydrogenation. On the other hand, in order to minimise the volume of the apparatus and the consumption of energy for technological and economic reasons, it is desirable to avoid the use of excessively high proportions of water. As a general rule, the proportion of water employed may vary from 15% to 150% by weight based on the weight of peroxides treated, and the optimum proportion is generally from 80% to 100% by weight. The figures are appropriate for the hydrogenation of cyclohexene hydroperoxide and may be modified appropriately for hydroperoxides of other molecular weights to give the same proportions of water on a molar basis. Within the ranges, the proportion of water may be varied, taking into account the peroxide concentration in the oxidation product, and the operating conditions (e.g. apparatus, temperature, rates of supply and catalyst).

Suitable catalysts are palladium, rhodium, rhenium, nickel and platinum (especially palladium) deposited on supports having a neutral or acid reaction. Examples of suitable supports are charcoals treated with nitric acid, silicas having an acid reaction, or aluminas treated with acid, but the preferred supports consist of agglomerates of silica, alumina or aluminosilicate grains, the agglomeration being carried out by fusion or sintering or with a siliceous flux. Supports in which at least 80% of the pores have a mean diameter larger than 1 micron and having a specific surface of less than 10 m.$^2$/g. are particularly suitable. The catalysts may be deposited upon the supports by any known method, but when the deposition process involves the use of basic materials, it is advisable to eliminate the residual alkalinity, for example by repeated washings. Preferably, the catalysts employed are relatively highly diluted in their support; thus, catalysts containing 0.5 g. of metal per kilogram of support are generally very suitable.

The treatment of the mixture of oxidation product and water with hydrogen in the presence of the catalyst is carried out under conditions such that the hydroperoxide and any other peroxides present in the solution are reduced. It is to be understood that if the oxidation product contains a cycloalkanone, it is unnecessary to reduce it to a cycloalkanol when the final product is intended for the production of aliphatic diacids. Moreover, it is preferable to carry out the treatment with hydrogen under the gentlest possible conditions in order to obtain the best yield of cycloalkanol, or mixture of cyclolakanol and cycloalkanone, which is a further reason for not attempting to reduce the ketone simultaneously with the hydroperoxide. In practice, hydrogen pressures of 10 to 20 bars and a temperature of 80° to 130° C. are very suitable. However, these limits are not absolute, and they may vary somewhat in accordance with the cycloalkane hydroperoxide and the operating conditions. Thus, it might be desirable to operate with hydrogen pressures lower than 10 bars or higher than 20 bars. So far as the temperature is concerned, it is to be noted that excessively high temperatures favour the formation of by-products, while, at excessively low temperatures, the reaction speed becomes too low.

In practice, in carrying out the new process, hydrogen may be passed into a mixture of oxidation product, water and catalyst brought to an appropriate temperature, in an apparatus optionally provided with means for adjusting the temperature of the medium to the chosen optimum value. In another mode of performing the process, a catalyst on a granular support is introduced into a column, hydrogen under pressure is introduced into the column, and the oxidation product and water, which are supplied separately or in admixture at the top of the column, are trickled over the catalyst bed. The oxidation product and the water are preferably preheated to a temperature in the neighbourhood of that of the reaction medium, the latter being adjusted by any appropriate regulating system to remove the heat introduced by the reaction. A deperoxidised solution is collected at the bottom of the column, and is then treated to separate the cycloalkanol, or the mixture of cycloalkanol and cycloalkanone, by the usual methods.

Thus, after the deperoxidation, the mixture may be neutralised, for example with a little ammonia or sodium bicarbonate, the product is decanted, the aqueous solution is extracted with a solvent (preferably the same cycloalkane as that employed in the previous oxidation), and the organic fractions are collected and distilled.

The new process may be applied to any cycloalkane oxidation product having from 5 to 16 carbon atoms in the ring, and more particularly to those derived from cycloalkanes having 6 to 12 carbon atoms in the ring. It concerns especially the conversion of cyclohexane into cyclohexanol or into mixtures of cyclohexanol and cyclohexanone. The yields are higher than in previously known processes. The process used is very simple and not troublesome. The same apparatus and the same catalyst may be employed without any stoppages for cleaning being necessary and without the catalyst exhibiting any loss of activity.

The following examples illustrate the invention.

EXAMPLE 1

The apparatus used consists of a vertical stainless-steel column (height 1 m., diameter 3 cm.) having a useful capacity of 0.5 l. and possessing a jacket through which a fluid at 90° C. is circulated. This column is packed with fragments of a porous solid support having metallic palladium deposited thereon in a proportion of 0.5 g. of Pd per kilogram of support. The fragments are about 0.5 cm. in diameter and consist of grains of electrolytic porcelain united by a siliceous binder. The support has a specific surface of 6 m.$^2$/g. and an apparent density of 0.761; it can absorb 20% of its weight of water, 80% of the pores having a mean diameter of more than 15 microns.

At the top of the packed column, a preconcentrated cyclohexane solution, obtained by the oxidation of cyclohexane with air in the absence of a catalyst, and which, after concentration, contains 12% of peroxides, 1.5% of cyclohexanol, 1% of cyclohexanone and 2.4% of less volatile products consisting mainly of acids and esters, is injected at 80° C. at a rate of 2 l./h.

Hydrogen under a pressure of 15 bars and water at 80° C. are simultaneously admitted at the top of the column at a rate of 200 cc./hour (which represents a quantity of water equal to 80% of the weight of peroxides subjected to the hydrogenation). Under these conditions, the temperature of the reactants in the column is kept at about 93-95° C.

The effluent products are subjected to an alkaline washing and then distilled. 131 g. of a mixture of cyclohexanol and cyclohexanone (containing 84.6% of cyclohexanol) are obtained per kg. of the solution subjected to hydrogenation.

After operation for more than 1000 hours, the catalyst has retained its activity and no hydroperoxide is found in the effluent.

If the operation is carried out under the same conditions with a solution of identical composition, but without any introduction of water into the column, the catalyst is gradually deactivated. Consequently, a certain proportion of peroxide passes into the effluent without being reduced, and, by the end of 6 hours, 0.3% of hydroperoxide is found in the effluent products, and this proportion increases with time.

The oxidation product employed was prepared by the action of air of lowered oxygen content (13–14% by volume of $O_2$) on cyclohexane at 170–180° C. under a pressure of 18 bars in a stainless-steel apparatus passivated with pyrophosphate, the oxidation being stopped when the proportion of products less volatile than cyclohexane reaches 4% by weight in the medium. The concentration was effected by expansion of the product as it left the oxidation apparatus, followed by distillation under a moderate vacuum at a temperature at most equal to 95° C.

EXAMPLE 2

A stainless-steel column (height 3 m., diameter 6.6 cm.) having a useful capacity of 10 litres, packed with fragments of a porous aluminosilicate supporting a metallic palladium deposit in the same proportion as in Example 1 is employed. The aluminosilicate employed consists of silica and alumina grains agglomerated by fusion, and has a specific surface of less than 1 m.$^2$/g. and a pore diameter essentially between 1000 and 1500 microns.

A cyclohexane oxidation product at 30° C., identical to that employed in Example 1, is injected at the top of the column, at a rate of 12 kg./h. Hydrogen under a pressure of 10 bars at a rate of 1900 l./h., and water at 80° C. at a rate of flow of 1.2 kg./h. are simultaneously admitted at the top of the column. Under these conditions, the temperature of the mixture in the column is maintained in the neighbourhood of 115° C.

The gaseous effluent in the base of the column consists of excess hydrogen and a mixture of water vapour and cyclohexane. It is cooled to condense the condensable vapours and to separate the hydrogen, which is recycled.

The liquid effluents when treated as indicated in Example 1 give a yield of cyclohexanol and cyclohexanone identical to that of Example 1. After operation for 800 hours, the conversion of the hydroperoxide is still complete and the catalyst has fully retained its activity.

EXAMPLE 3

A vertical stainless-steel column (height 3 m., diameter 4 cm.) having a useful capacity of 3.5 l., packed with alumina grains agglomerated by sintering, carrying a palladium deposit in a proportion of 1 g. of metal per kilogram of support, is employed. This support has pores of which 75% have a diameter larger than 15 microns. In addition, it has a specific surface of less than 0.1 m.$^2$/g.

A solution identical to that of Example 1 is hydrogenated under conditions similar to those described in Example 2, except that the hydrogen is admitted at a rate of 900 l./h. Under these conditions, the temperature of the mixture in the column is maintained in the neighbourhood of 125° C. The yield of cyclohexanol and cyclohexanone is identical to that obtained in Example 1.

We claim:
1. In a process for the production of cyclohexanol, and mixtures of cyclohexanol and cyclohexanone, by the hydrogenation of cyclohexane hydroperoxide as a 2.5 to 25% by weight solution in cyclohexane, at 80° to 130° C. under a hydrogen pressure of 10 and 20 bars in the presence of a palladium catalyst on a non-basic support, the improvement which consists in adding 15% to 150% by weight of water based on the initial weight of cyclohexane hydroperoxide to the solution before effecting the hydrogenation.

2. In a process for the continuous preparation of mixtures of cyclohexanol and cyclohexanone from solutions of cyclohexane hydroperoxide in cyclohexane containing 2.5 to 25% by weight of the said hydroperoxide by hydrogenation of the said solution in the presence of a palladium hydrogenation catalyst on a non-basic support, the improvement which consists in adding 15% to 150% by weight of water based on the initial weight of cyclohexane hydroperoxide to the solution before effecting the hydrogenation.

3. The improvement of claim 2 in which the solution of cyclohexyl hydroperoxide in cyclohexane is one produced by the oxidation of cyclohexane with oxygen in the absence of a catalyst.

4. The improvement of claim 2 in which the proportion of water is 80 to 100% by weight based on the cyclohexane hydroperoxide to be reduced.

5. The improvement of claim 2 in which the hydrogenation catalyst is palladium deposited on a granular silica, alumina, or aluminosilicate support.

6. The improvement of claim 5 in which the said granular support has been agglomerated by fusion, by sintering, or with a siliceous flux.

7. The improvement of claim 5 in which at least 80% of the pores of the support have a mean diameter larger than 1 micron and the support has a specific surface of less than 10 m.$^2$/g.

8. The improvement of claim 2 in which the hydrogenation is effected at 80° to 130° C. at a hydrogen pressure of 10 to 20 bars.

References Cited

UNITED STATES PATENTS 2,497,349  2/1950  Farkas _____ 260—617

FOREIGN PATENTS 964,869  7/1964  Great Britain _____ 260—631

BERNARD HELFIN, Primary Examiner

N. P. MORGANSTERN, Assistant Examiner

U.S. Cl. X.R.

260—631